United States Patent
Masuda (10) Patent No.: US 11,651,747 B2
(45) Date of Patent: May 16, 2023

(54) FLICKER MEASUREMENT DEVICE AND MEASUREMENT METHOD

(71) Applicant: Konica Minolta, Inc., Tokyo (JP)

(72) Inventor: Satoshi Masuda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/774,926

(22) PCT Filed: Oct. 21, 2020

(86) PCT No.: PCT/JP2020/039597
§ 371 (c)(1),
(2) Date: May 6, 2022

(87) PCT Pub. No.: WO2021/090689
PCT Pub. Date: May 14, 2021

(65) Prior Publication Data
US 2022/0406270 A1 Dec. 22, 2022

(30) Foreign Application Priority Data
Nov. 7, 2019 (JP) .............................. JP2019-202214

(51) Int. Cl.
*G09G 5/00* (2006.01)

(52) U.S. Cl.
CPC ......... *G09G 5/003* (2013.01); *G09G 2354/00* (2013.01); *G09G 2360/141* (2013.01)

(58) Field of Classification Search
CPC .............. G09G 5/003; G09G 2354/10; G09G 2360/141
See application file for complete search history.

(56) References Cited

U.S. PATENT DOCUMENTS

| | | | |
|---|---|---|---|
| 2005/0103979 A1 | 5/2005 | Heigel | |
| 2014/0111558 A1* | 4/2014 | Ishitani | G09G 5/10 345/690 |
| 2016/0337571 A1* | 11/2016 | Suzuki | H04N 5/2357 |

FOREIGN PATENT DOCUMENTS

| | | | | |
|---|---|---|---|---|
| CN | 101714328 B | * | 8/2012 | .......... G09G 3/3225 |
| JP | 2016058838 A | * | 4/2016 | |
| JP | 2017146098 A | * | 8/2017 | |

OTHER PUBLICATIONS

PCT International Preliminary Report on Patentability with Written Opinion for International Application No. PCT/JP2020/039597; dated May 10, 2022.

(Continued)

*Primary Examiner* — Ricardo Osorio
(74) *Attorney, Agent, or Firm* — Cantor Colburn LLP (57) ABSTRACT

Provided with: a detecting means to detect a possible light intensity changing frequency of a measuring object; a frequency determining means to determine a light intensity changing frequency with reference to the possible light intensity changing frequency; a resolution determining means to determine a frequency resolution for flicker measuring with reference to the determined light intensity changing frequency; and a flicker measuring means to conduct flicker measuring with the determined frequency resolution. The resolution determining means determines the frequency resolution to be an integral submultiple of the light intensity changing frequency determined by the frequency determining means.

18 Claims, 5 Drawing Sheets

(56) References Cited

OTHER PUBLICATIONS

International Search Report for International Application No. PCT/JP2020/039597; dated Jan. 12, 2021.

\* cited by examiner

Conventional Measurement

Measurement according to the Enbodiment

Conventional Measurement vs Measurement according to the Enbodiment

FLICKER MEASUREMENT DEVICE AND MEASUREMENT METHOD

CROSS REFERENCE TO RELATED APPLICATIONS

This is the U.S. national stage of application No. PCT/JP2020/039597, filed on Oct. 21, 2020. Priority under 35 U.S.C. § 119(a) and 35 U.S.C. § 365(b) is claimed from Japanese Application No. 2019-202214, filed Nov. 7, 2019, the disclosure of which is also incorporated herein by reference.

TECHNICAL FIELD

The present invention relates to a flicker measuring device that measures flicker of a measuring object such as a display; and a flicker measuring method.

BACKGROUND ART

Common displays for personal computers, for example, update images periodically in accordance with a vertical synchronizing signal (Vsync), thus have a periodic change in screen luminance in accordance with a vertical synchronizing signal. Such displays may be liquid-crystal displays (LCD) that adopts an inversion driving method, in which the polarity is inverted depending on whether odd-numbered or even-numbered the frame is. In this case, their periodic change in screen luminance has a doubled frequency.

Humans perceive such a periodic change in screen luminance as a flickering phenomenon (flicker).

Meanwhile, a display color analyzer (for example, the model CA-410 by KONICA MINOLTA, INC.) is known as a photometer that measures the basic performance of displays. Such a display color analyzer is provided with an internal optical sensor, and thus capable of measuring an optical waveform and flicker as well as colors and luminance.

There are measurements of flicker standardized by JEITA, VESA, IEC, and other standardization body. To obtain an accurate evaluation of a human eye frequency response, a temporal contract sensitivity function (TCSF), each of the standardization bodies adopts the following process.

The process is obtaining intensity from each frequency component by computing the digital Fourier transform of an obtained optical waveform, obtaining intensity reflecting the human eye frequency response by multiplying the intensity from each frequency component by TCSF, then calculating a flicker value by a computational method conforming to the standardization bodies.

Since displays feature the presence of a light emission period, a measuring target, a light intensity changing frequency can be chiefly limited to the following elements.

Frequency (fv) of Vertical Synchronizing Signal Vsync and Harmonics (fv*n) thereof LCD: Frequency (fv/2) of ½*Vsync and Harmonics (fv/2*n) thereof Display with a backlight modulator: Modulated Frequency (fmo) and Harmonics (vmo*n) thereof Patent Literature 1 discloses a technique that allows an optical measuring device (spectroscope) with an array sensor to determine the value of a measuring time by high-speed scanning and synchronize a luminous source that runs intermittently.

CITATION LIST

Patent Literature 1: US Patent Application Publication No. 2005-0103979

SUMMARY OF THE INVENTION

Technical Problem

Conventional flicker measuring devices measure flicker with a predetermined frequency resolution (fres), for example, 1 Hz. Thus, frequency spectrum data obtained by a conventional measurement is a set of discrete intensity data by a fundamental unit of frequency resolution fres.

Yet, there is a problem because measurable frequencies are discrete. Unless a target frequency at which to measure flicker is (matches) an integral multiple of a frequency resolution, intensity is distributed to two frequencies before and after the measurement target frequency, which causes errors in measurement. In particular, measuring with a predetermined frequency resolution is not sufficient because displays have individual differences in their frequencies of vertical synchronizing signals.

Measuring flicker with a high frequency resolution may be a method of preventing such errors, however, will extend the measuring time because the frequency resolution is equivalent to the inverse of the measuring time as described later.

Patent Literature 1 does not describe flicker measuring or the above-described problem relating to flicker measuring. Thus, the above-described problem can never be solved with reference to Patent Literature 1.

The present invention, which has been made in consideration of such a technical background as described above, is aimed at providing a flicker measuring device and a flicker measuring method that are capable of measuring flicker of a measuring object such as a display in a quick and accurate manner.

Solution to Problem

The above-described aim can be achieved by the following means.

[1] A flicker measuring device comprising:
a detecting means to detect a possible light intensity changing frequency of a measuring object,
a frequency determining means to determine a light intensity changing frequency with reference to the possible light intensity changing frequency determined by the detecting means,
a resolution determining means to determine a frequency resolution for flicker measuring with reference to the light intensity changing frequency determined by the frequency determining means; and
a flicker measuring means to measure flicker with the frequency resolution determined by the resolution determining means,
wherein the resolution determining means determines the frequency resolution to be an integral submultiple of the light intensity changing frequency determined by the frequency determining means.

[2] The flicker measuring device as recited in the foregoing item [1], wherein the detecting means:
obtains waveform data of light intensity changes by preparatory measuring prior to flicker measuring,
obtains frequency spectrum data by computing a Fourier transform of the waveform data; and detects the possible light intensity changing frequency with reference to a singular frequency with an intensity being higher than an intensity at an adjacent frequency according to the frequency spectrum data.

[3] The flicker measuring device as recited in the foregoing item 1 or 2, wherein the frequency determining means determines the light intensity changing frequency to be a lowest possible frequency among the possible light intensity changing frequencies.

[4] The flicker measuring device as recited in the foregoing item 1 or 2, further comprising a selecting means allowing a user to select one possible frequency of the possible light intensity changing frequencies detected by the detecting means, wherein the frequency determining means determines the light intensity changing frequency to be the one possible frequency selected by the user via the selecting means.

[5] The flicker measuring device as recited in the foregoing item 1 or 2, further comprising an input means allowing the user to input the light intensity changing frequency, wherein the frequency determining means determines the light intensity changing frequency to be one possible frequency of the possible light intensity changing frequencies detected by the detecting means, the one possible frequency being the closest to the light intensity changing frequency inputted via the input means.

[6] The flicker measuring device as recited in the foregoing item 2, wherein the detecting means detects the possible light intensity changing frequency by interpolation, the interpolation using the intensity at the frequency adjacent to the singular frequency according to the frequency spectrum data, the singular frequency having the intensity higher than the intensity at the adjacent frequency.

[7] The flicker measuring device as recited in the foregoing item 1, wherein the detecting means:
obtains waveform data of light intensity changes by preparatory measuring prior to flicker measuring; and
detects the possible light intensity changing frequency by an autocorrelation analysis of the waveform data.

[8] The flicker measuring device as recited in any one of the foregoing items 1 to 7, wherein the frequency resolution is 1 Hz or higher.

[9] The flicker measuring device as recited in any one of the foregoing items 1 to 8, further comprising a recording means to record the frequency resolution determined by the resolution determining means.

[10] A flicker measuring method comprising:
a step of detecting a possible light intensity changing frequency of a measuring object by a detecting means,
a step of determining a light intensity changing frequency with reference to the possible light intensity changing frequency determined in the detecting step, by a frequency determining means,
a step of determining a frequency resolution for flicker measuring with reference to the light intensity changing frequency determined in the frequency determining step, by a resolution determining means; and
a step of measuring flicker with the frequency resolution determined in the resolution determining step, by a flicker measuring means,
wherein, in the resolution determining step, the frequency resolution is determined to be an integral submultiple of the light intensity changing frequency determined in the frequency determining step.

[11] The flicker measuring method as recited in the foregoing item 10, wherein, in the detecting step:
waveform data of light intensity changes is obtained by preparatory measuring prior to flicker measuring,
frequency spectrum data is obtained by computing a Fourier transform of the waveform data; and
the possible light intensity changing frequency is detected with reference to a singular frequency with an intensity being higher than an intensity at an adjacent frequency according to the frequency spectrum data.

[12] The flicker measuring method as recited in the foregoing item 10 or 11, wherein, in the frequency determining step, the light intensity changing frequency is determined to be a lowest possible frequency among the possible light intensity changing frequencies.

[13] The flicker measuring method as recited in the foregoing item 10 or 11, wherein, in the frequency determining step, the light intensity changing frequency is determined to be one possible frequency of the possible light intensity changing frequencies detected in the detecting step, the one possible frequency being selected by a user via a selecting means.

[14] The flicker measuring method as recited in the foregoing item 10 or 11, wherein, in the frequency determining step, the light intensity changing frequency is determined to be one possible frequency of the possible light intensity changing frequencies detected in the detecting step, the one possible frequency being the closest to a light intensity changing frequency inputted by a user via an input means.

[15] The flicker measuring method as recited in the foregoing item 11, wherein, in the detecting step, the possible light intensity changing frequency is detected by interpolation using the intensity at the frequency adjacent to the singular frequency according to the frequency spectrum data, the singular frequency having the intensity higher than the intensity at the adjacent frequency.

[16] The flicker measuring method as recited in the foregoing item 10, wherein, in the detecting step:
waveform data of light intensity changes is obtained by preparatory measuring prior to flicker measuring; and
the possible light intensity changing frequency is detected by an autocorrelation analysis of the waveform data.

[17] The flicker measuring method as recited in any one of the foregoing items 10 to 16, wherein the frequency resolution is 1 Hz or higher.

[18] The flicker measuring method as recited in any one of the foregoing items 10 to 17, further comprising a step of recording and storing the frequency resolution determined in the resolution determining step.

According to the invention described in the foregoing items 1 and 10, possible light intensity changing frequencies of a measuring object are detected, and the light intensity changing frequency is determined with reference to the detected possible frequencies. Then, the frequency resolution is determined to be an integral submultiple of the determined light intensity changing frequency. The frequency resolution is determined to be an adequate frequency resolution with reference to a measured light intensity changing frequency of the measuring object, and flicker measuring is conducted with the determined adequate frequency resolution. Thus, this measurement of flicker can be conducted in an error-less and accurate manner. Since the light intensity changing frequency is a measured light intensity changing frequency, the frequency resolution is never set to be lower than necessary. Thus, this accurate measurement of flicker can be conducted in a quick manner.

According to the invention described in the foregoing items 2 and 11, waveform data of light intensity changes is obtained by preparatory measuring prior to flicker measuring, and frequency spectrum data is obtained by computing the Fourier transform of the waveform data. Then, possible light intensity changing frequencies are detected with reference to singular frequencies with intensities being higher than those at the adjacent frequencies according to the frequency spectrum data, and thus these possible frequencies correspond to the measured light intensity changing frequencies of the measuring object. Thus, the light intensity changing frequency can be determined in an accurate manner.

According to the invention described in the foregoing items 3 and 12, the light intensity changing frequency is determined to be the lowest possible frequency among the possible light intensity changing frequencies. Thus, this measurement of flicker can minimize errors even at harmonic frequencies.

According to the invention described in the foregoing items 4 and 13, the light intensity changing frequency is determined to be one of the possible light intensity changing frequencies, which is selected by the user. Thus, flicker at a frequency the user is most concerned with can be detected in an accurate manner.

According to the invention described in the foregoing items 5 and 14, the light intensity changing frequency is determined to be one of the light intensity changing frequencies, which is the closest to a light intensity changing frequency inputted by the user. Thus, flicker at a frequency adjacent to a frequency the user is most concerned with can be detected in an accurate manner.

According to the invention described in the foregoing items 6 and 15, possible light intensity changing frequencies are detected by interpolation using intensities at frequencies adjacent to singular frequencies having intensities higher than those at the adjacent frequencies according to the frequency spectrum data. Thus, the light intensity changing frequencies can be determined in an accurate manner.

According to the invention described in the foregoing items 7 and 16, waveform data of light intensity changes is obtained by preparatory measuring prior to flicker measuring, and possible light intensity changing frequencies are detected by an autocorrelation analysis of the waveform data. Thus, the time for preparatory measuring can be shortened.

According to the invention described in the foregoing items 8 and 17, the measuring time for flicker measuring can be shortened.

According to the invention described in the foregoing items 9 and 18, the determined frequency resolution is recorded and stored on a recording means, and a subsequent flicker measuring can omit a process of detecting possible light intensity changing frequencies, a process of determining the light intensity changing frequency, and a process of determining the frequency resolution. Thus, the time for flicker measuring can be shortened.

DESCRIPTION OF THE EMBODIMENTS

Hereinafter, one or more embodiments of the present invention will be described with reference to the drawings.

Figure 1:
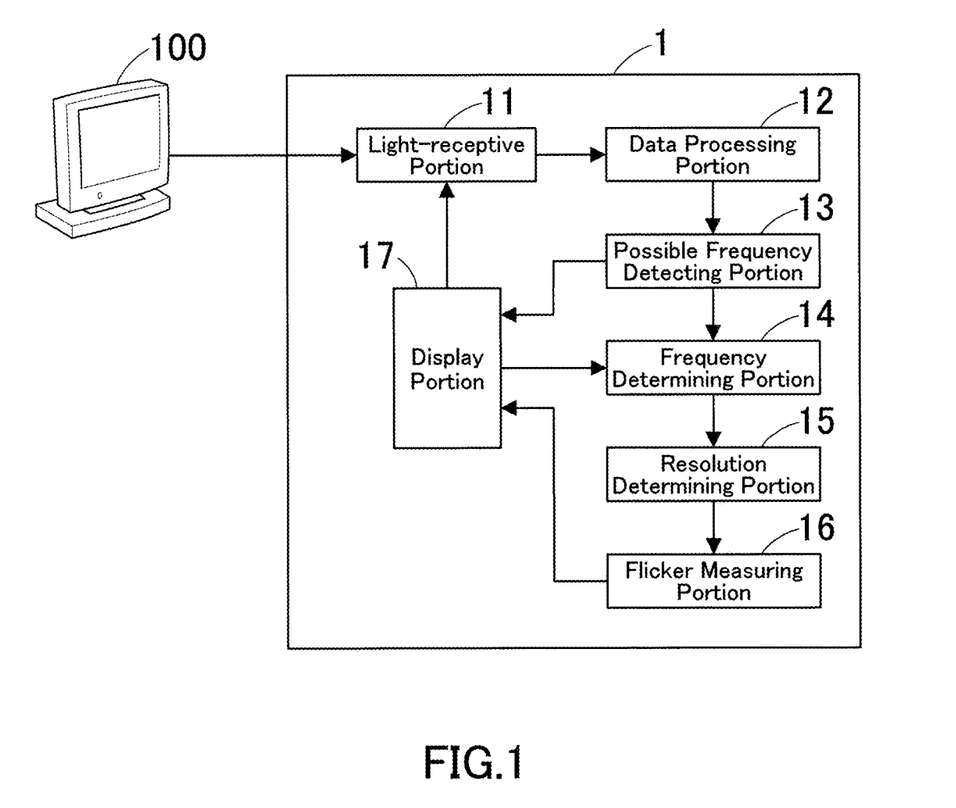
FIG. 1 is a block diagram illustrating a functional configuration of a flicker measuring device according to one embodiment of the present invention.

FIG. 1 is a block diagram illustrating a functional configuration of a flicker measuring device 1 according to one embodiment of the present invention.

As illustrated in FIG. 1, the flicker measuring device 1 is provided with: a light-receptive portion 11; a data processing portion 12; a possible frequency detecting portion 13; a frequency determining portion 14; a resolution determining portion 15; a flicker measuring portion 16; a display portion 17; and the like.

The light-receptive portion 11 is provided with a photosensor, receiving light from the measuring object 100 such as a display. The data processing portion 12 runs a predetermined process such as amplification on the light data obtained by the light-receptive portion 11. The possible frequency detecting portion 13 detects possible light intensity changing frequencies with reference to the obtained light data, which has been subjected to the process by the data processing portion 12. The frequency determining portion 14 determines the light intensity changing frequency to be one of the detected possible frequencies.

The resolution determining portion 15 determines the frequency resolution with reference to the light intensity changing frequency determined by the frequency determining portion 14. The flicker measuring portion 16 measures flicker with the frequency resolution determined by the resolution determining portion 15. The display portion 17 displays measured results of flicker.

Hereinafter, operations of the flicker measuring device 1 will be described.

To start, a user sets the flicker measuring device 1 at a measuring position. When the user gives an instruction to start measuring, for example, by pressing a measurement start button displayed on the display portion 17, then the light-receptive portion 11 receives light to be measured from the measuring object 100. The data processing portion 12 runs a predetermined data process such as amplification on the received light, then inputs the data into the possible frequency detecting portion 13.

The possible frequency detecting portion 13 detects possible light intensity changing frequencies (hereinafter also referred to as possible frequencies) of the measuring object 100. The frequency determining portion 14 determines the light intensity changing frequency to be one of the detected possible frequencies.

Figure 2:
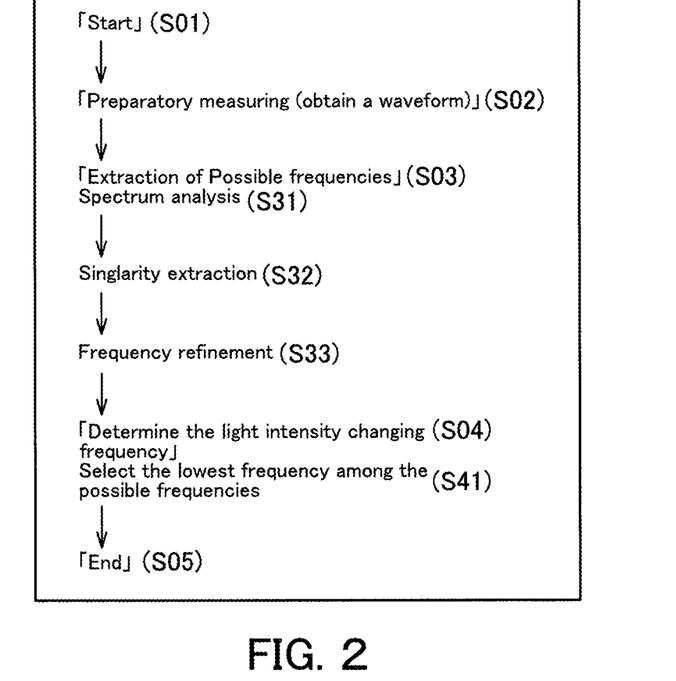
FIG. 2 is a flowchart representing a process of detecting possible light intensity changing frequencies and determining the light intensity changing frequency.

FIG. 2 is a flowchart representing an example of a process of detecting possible frequencies and determining the light intensity changing frequency. This embodiment uses a possible frequency detecting method, for example, in which possible frequencies are detected with reference to waveform data of light intensity changes obtained by preparatory measuring. Frequencies higher than a threshold may be used as possible frequencies.

As referred to the flowchart of FIG. 2, the process is started in Step S01. Light is then received from the measuring object 100 by preparatory measuring (premeasurement) and waveform data of light intensity changes is obtained (Step S02). Subsequently, extraction (detection) of possible frequencies is conducted (Step S03). Specifically, this starts with spectrum analysis on the obtained waveform data (Step S31). To shorten the time for preparatory measuring, spectrum analysis may be conducted with a low frequency resolution in the preparatory measuring.

Figure 3:
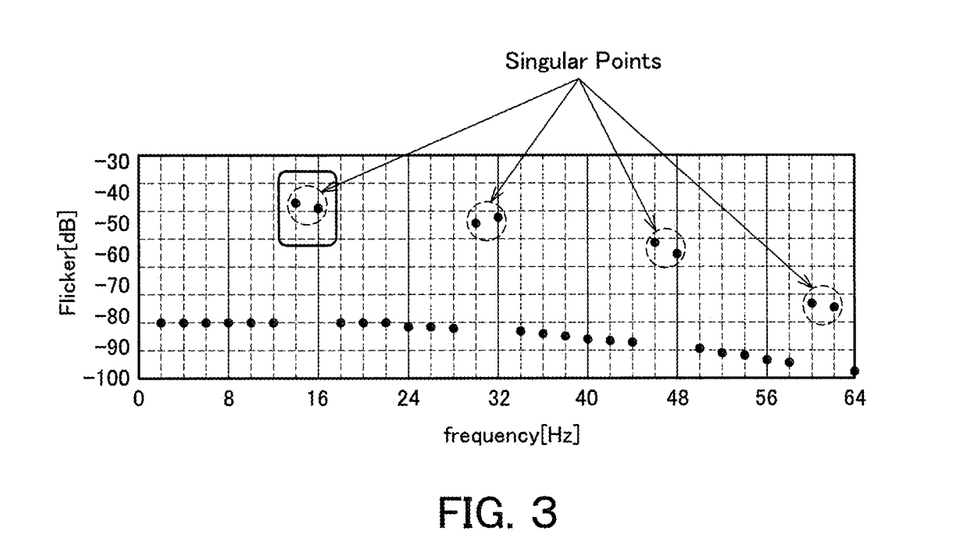
FIG. 3 illustrates an example of spectrum data as spectral analysis results of obtained waveform data.

FIG. 3 illustrates an example of spectrum data as spectral analysis results. In the example of FIG. 3, the frequency resolution is set to 2 Hz. In the example of FIG. 2, according to the spectrum data, the intensity is higher at the frequencies of 14, 16, 30, 32, 46, 48, 60, and 62 Hz than at the adjacent frequencies, and these frequencies constitute singular points. It is deemed that actual possible frequencies with peaks of intensity exist adjacent to the singular points.

Back to the flowchart of FIG. 2, singular points as indicated in the spectrum data of FIG. 3 are extracted (Step S32), the frequencies are then refined by an interpolation process using the intensities at the frequencies adjacent to the singular frequencies (Step S33). Frequency refinement by interpolation is not limited; it may be conducted by barycentric sensing, for example.

By frequency refinement, the frequencies with peaks of intensity are obtained, and the obtained frequencies are put in a list as possible frequencies. Each possible frequency includes a fundamental frequency and its harmonics.

Then, the light intensity changing frequency is determined to be one of the possible light intensity changing frequencies from the list (Step S04). Here is a specific example of the judgment method, in which the light intensity changing frequency is determined to be the lowest possible frequency among the possible frequencies (Step S41). The process of detecting possible frequencies and determining the light intensity changing frequency is terminated (Step S05).

The resolution determining portion 15 determines the frequency resolution with reference to the light intensity changing frequency determined as described above. In this embodiment, the frequency resolution is determined to be an integral submultiple of the determined light intensity changing frequency. This can be represented by Frequency Resolution fres=Light Intensity Changing Frequency/$n$, wherein $n$ is an integer    Expression 1

The sampling frequencies the number of pieces of data (the number of sampling times) are adjusted with reference to the frequency resolution fres which is obtained by eq 1. For example, sampling frequencies are adjusted while the number of pieces of data is fixed to 1024. The frequency resolution fres also can represented by Expression 2 given below.

Frequency Resolution fres=Sampling Frequency/ Number of Pieces of Data=1/measuring time    Expression 2

As understood from Expression 2, the lower the frequency resolution is, the longer the measuring time becomes. In order to shorten the measuring time, it is thus preferred that the frequency resolution for flicker measuring be 1 Hz or higher.

After determining the frequency resolution, the flicker measuring portion 16 conducts flicker measuring (main measurement) with the determined frequency resolution. The light-receptive portion 11 may receive light from the measuring object 100 once again for flicker measuring. Alternatively, the obtained light data from preparatory measuring may be reused for flicker measuring. The display portion 17 displays measured results of flicker.

A described above, in this embodiment, possible light intensity changing frequencies (possible frequency) of the measuring object 100 are detected, and the light intensity changing frequency is determined to be one of the detected possible frequencies. Then, the frequency resolution is determined to be an integral submultiple of the determined light intensity changing frequency. In other words, unlike in the conventional measurement of flicker using a predetermined frequency resolution, the frequency resolution is determined to be an adequate frequency resolution with reference to a measured light intensity changing frequency of the measuring object, and flicker measuring is conducted with the adequate frequency resolution. Thus, this measurement of flicker can be conducted in an error-less and accurate manner. Since the light intensity changing frequency is a measured light intensity changing frequency, the frequency resolution is never set to be lower than necessary. Thus, this accurate measurement of flicker can be conducted in a quick manner.

Furthermore, in this embodiment, waveform data of light intensity changes is obtained by preparatory measuring prior to flicker measuring, and frequency spectrum data is obtained by computing the Fourier transform of the waveform data. Then, possible frequencies are detected with reference to singular frequencies with intensities being higher than those at the adjacent frequencies according to the frequency spectrum data, and thus these possible frequencies correspond to the measured light intensity changing frequencies of the measuring object. Thus, the light intensity changing frequency can be determined in an accurate manner.

Furthermore, possible frequencies are detected by interpolation, and the interpolation uses intensities at frequencies adjacent to singular frequencies having intensities higher than those at the adjacent frequencies according to the frequency spectrum data. Thus, possible frequencies can be detected in an accurate manner. The light intensity changing frequency is determined to be the lowest possible frequency among the possible frequencies. Thus, this measurement of flicker also can minimize errors in harmonics.

Figure 4:
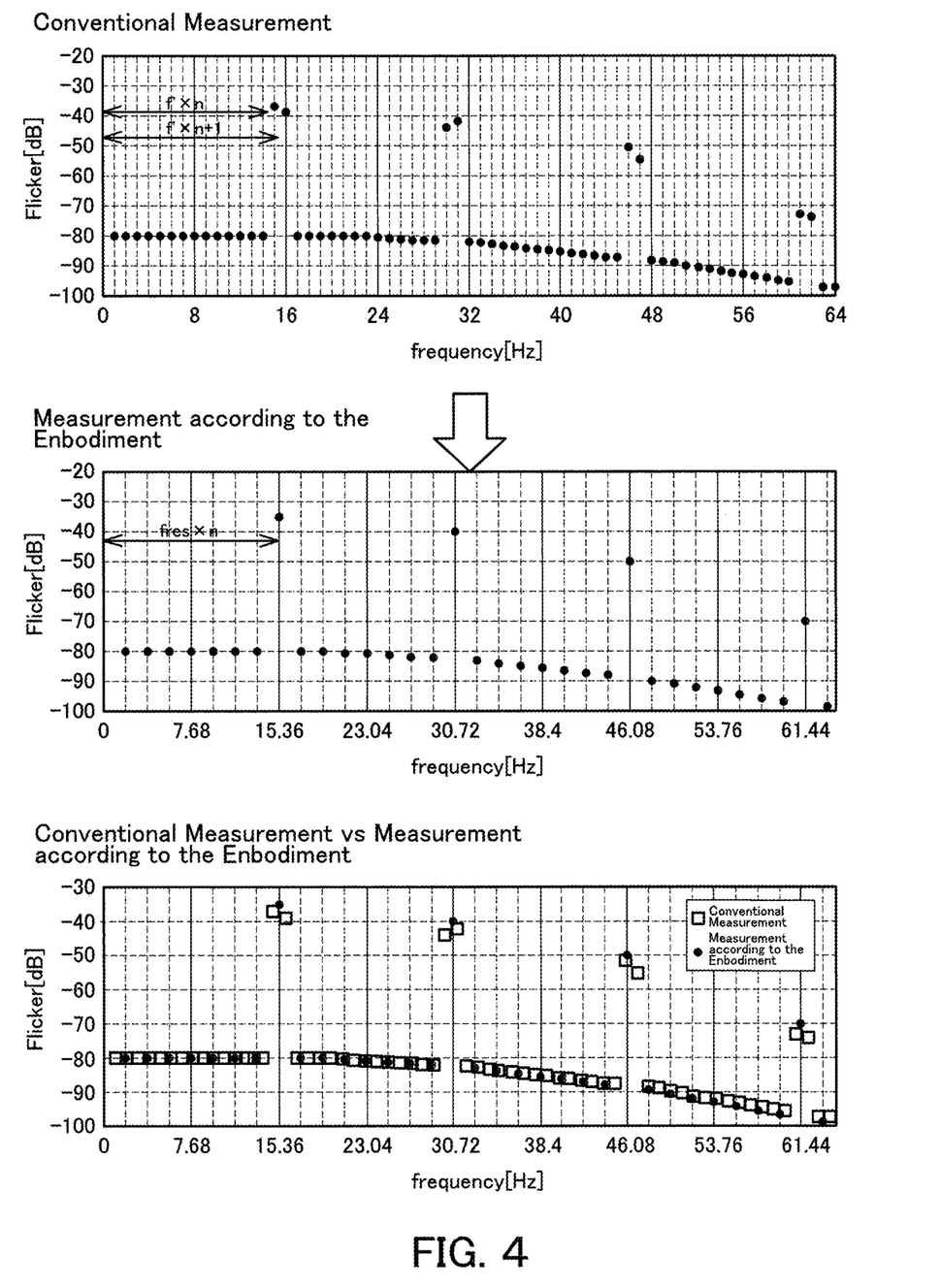
FIG. 4 is a view to compare the measurements of flicker in accuracy: a measurement using a frequency resolution that is determined according to the embodiment; and a conventional measurement using a predetermined frequency resolution.

FIG. 4 is a view to compare the measurements of flicker in accuracy: a measurement using a frequency resolution that is determined according to the above-described embodiment; and a conventional measurement using a predetermined frequency resolution.

The graph on the top tier of FIG. 4 relates to an example of the conventional measurement using a predetermined frequency resolution of 1 Hz. The graph on the middle tier relates to an example of the measurement using a frequency resolution that is determined according to the present embodiment. In the present embodiment, the light intensity changing frequency of the measuring object, 15.36 Hz (fres×n) and a double, triple, and quadruple of the frequency, which are harmonic components, are obtained in an accurate manner. Thus, the intensities are obtained at an adequate frequency resolution. In contrast, in the example of the conventional measurement on the top tier, two peak values are measured at a frequency of 15 Hz (f'×n) and a frequency of 16 Hz {f'×(n+1)}, and other pairs of two peak values are also measured in the frequency range of their harmonic components.

These two graphs are merged into one as shown on the bottom tier of FIG. 4. The graph on the bottom tier contains black dots representing the values from the present embodiment and empty square dots representing the values from the example of the conventional measurement. As understood from the graph, the present embodiment is free from errors and achieves accuracy in measurement while the conventional measurement causes errors.

According to the above-described embodiment, the light intensity changing frequency is determined to be the lowest possible frequency among multiple possible frequencies, for example. It should be understood that a method of determining the light intensity changing frequency is in no way limited to this example. In a particular example in which a user, for example, a display design engineer hopes to conduct flicker measuring for evaluation, the user is supposed to know the light intensity changing frequency.

Figure 5:
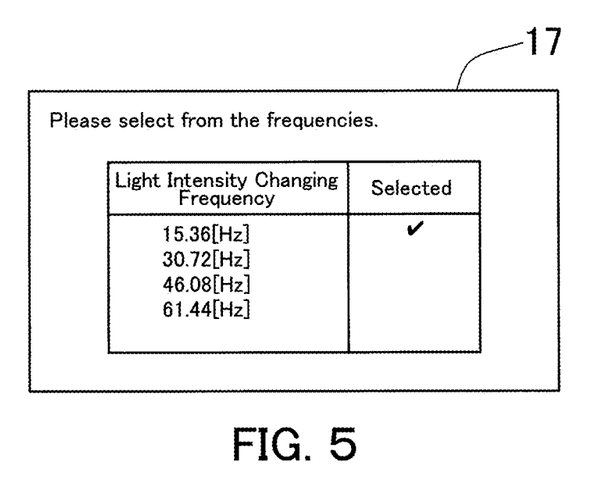
FIG. 5 illustrates a display screen displayed on a display, allowing a user to select from the possible light intensity changing frequencies listed on the display.

Accordingly, the display portion 17 may display the detected possible frequencies in a list along with a message like "please select from the frequencies" as referred to FIG. 5, allowing the user to select his/her preferred option. In the example of FIG. 5, the display portion 17 displays four possible frequencies with a check mark given to one of them, a frequency of 15.37 Hz, indicating it is selected. Upon any of the possible frequencies being selected, the light intensity changing frequency is determined to be the selected possible frequency, and the frequency resolution is determined to be an integral submultiple of the selected possible frequency.

As described above, the user is allowed to select from the possible frequencies, and the light intensity changing frequency is determined to be one of the possible frequencies, which is selected by the user. Thus, flicker at a frequency the user is most concerned with can be detected in an accurate manner.

Singular frequencies, which are obtained as results of a spectrum analysis in preparatory measuring as indicated in the spectrum data of FIG. 3, may be displayed as possible frequencies for the user to select therefrom. In this case, the light intensity changing frequency, with reference to which the frequency resolution is determined, is determined to be a light intensity changing frequency that is closest to the selected singular frequency. For the accuracy of possible frequencies on the display, it is preferred that the possible frequencies in the list have been refined by interpolation.

Figure 6:
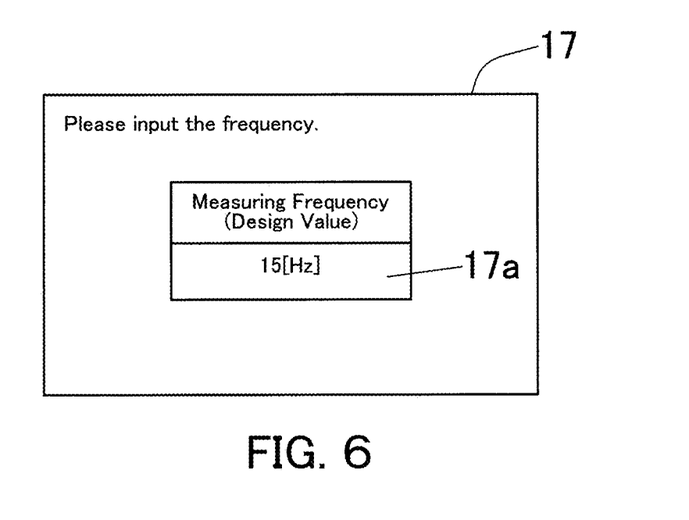
FIG. 6 illustrates a display screen allowing the user to set a design value for the light intensity changing frequency.

As referred to FIG. 6, the display portion 17 may display an input box 17a in place of the possible frequencies in the list, along with a message like "please select from the frequencies", allowing the user to input a design value for the light intensity changing frequency. In this case, the light intensity changing frequency is determined to be one of the possible frequencies, which is the closest to the inputted frequency. As described above, the user is allowed to input a light intensity changing frequency, and the light intensity changing frequency is determined to be a possible frequency that is the closest to the inputted light intensity changing frequency. Thus, flicker at a frequency adjacent to a frequency the user is most concerned with can be detected in an accurate manner.

Furthermore, in the above-described embodiment, waveform data of light intensity changes is obtained by preparatory measuring prior to flicker measuring, and frequency spectrum data is obtained by computing the Fourier transform of the obtained waveform data. Then, possible frequencies are detected with reference to singular frequencies with intensities being higher than those at the adjacent frequencies according to the frequency spectrum data. Possible frequencies may be detected by another method.

For example, after waveform data of light intensity changes is obtained by preparatory measuring prior to flicker measuring, a period of the changes (frequency) may be obtained immediately by an analysis of the obtained waveform data. An example of such an analysis may be an autocorrelation analysis of the waveform data. Possible frequencies can be detected by this autocorrelation analysis, which is a method of extracting periodicity by computing a coefficient of a correlation between waveform data of light intensity changes and this waveform data that is shifted by time. Alternatively, those can be detected by an image analysis, which is a method of extracting periodicity using singular points in the waveform data.

Detecting light intensity changing frequencies by an analysis of the waveform data will shorten the time for preparatory measuring while increasing computational burdens.

While one embodiment of the present invention has been described in detail herein, it should be understood that the present invention is not limited to this embodiment. For example, the possible frequency detecting portion 13 may have a configuration using a function of a conventional flicker measuring device which obtains frequency spectrum data by computing the Fourier transform of waveform data of light intensity changes or may have a configuration using a circuit dedicated to the detection of possible frequencies.

Figure 7:
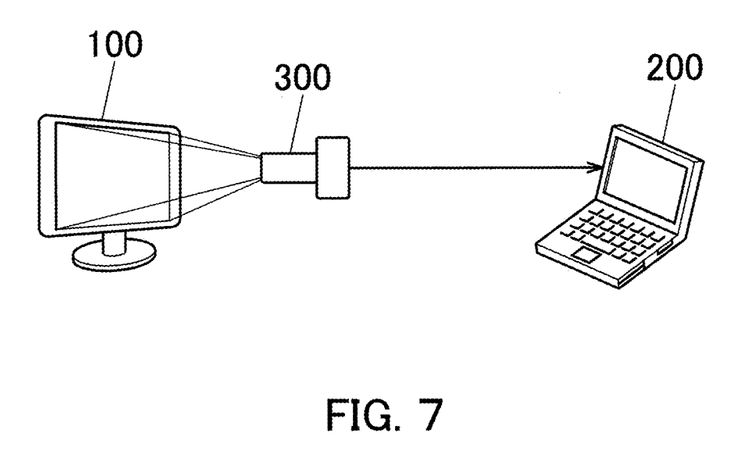
FIG. 7 illustrates a configuration according to another embodiment of the present invention.

Furthermore, the flicker measuring device may have a configuration that is a personal computer 200 as illustrated in FIG. 7. In this case, upon obtaining light data of the measuring object 100 from a conventional flicker measuring device 300, the personal computer 200 detects possible frequencies, determines the light intensity changing frequency, and determines the frequency resolution.

Furthermore, a frequency detecting step, a frequency determining step, a resolution determining step, and a flicker measuring step do not need to be run successively. For example, flicker measuring may be independently conducted with a frequency resolution that is obtained in advance from the frequency detecting step, the frequency determining step, and the resolution determining step. Such a controlled flow can be suitably applied to, for example, a Vcom adjustment when flicker measuring is conducted repeatedly while changing display control conditions of the measuring object 100 such as an LCD.

Furthermore, the determined frequency resolution may be recorded and stored on the flicker measuring device or an external recording device (for example, a personal computer) that is connected with the flicker measuring device. Having the frequency resolution recorded and stored in advance allows a subsequent flicker measuring to omit a process of detecting possible light intensity changing frequencies, a process of determining the light intensity changing frequency, and a process of determining the frequency resolution. This will shorten the time for flicker measuring accordingly.

INDUSTRIAL APPLICABILITY

The present invention can be used for measuring flicker of a measuring object such as a display.

REFERENCE SIGNS LIST

1 Flicker Measuring Device
11 Light-receptive Portion

13 Possible Frequency Detecting Portion
14 Frequency Determining Portion
15 Resolution Determining Portion
16 Flicker Measuring Portion
17 Display Portion
100 Measuring Object
200 Personal Computer

The invention claimed is:

1. A flicker measuring device comprising:
a detector configured to detect a possible light intensity changing frequency of a measuring object,
a frequency determining portion configured to determine a light intensity changing frequency with reference to the possible light intensity changing frequency determined by the detector,
a resolution determining portion configured to determine a frequency resolution for flicker measuring with reference to the light intensity changing frequency determined by the frequency determining portion; and
a flicker measuring portion configured to measure flicker with the frequency resolution determined by the resolution determining portion, wherein
the resolution determining portion determines the frequency resolution to be an integral submultiple of the light intensity changing frequency determined by the frequency determining portion.

2. The flicker measuring device as recited in claim 1, wherein the detector:
obtains waveform data of light intensity changes by preparatory measuring prior to flicker measuring,
obtains frequency spectrum data by computing a Fourier transform of the waveform data; and
detects the possible light intensity changing frequency with reference to a singular frequency with an intensity being higher than an intensity at an adjacent frequency according to the frequency spectrum data.

3. The flicker measuring device as recited in claim 1, wherein the frequency determining portion determines the light intensity changing frequency to be a lowest possible frequency among the possible light intensity changing frequencies.

4. The flicker measuring device as recited in claim 1, further comprising a selector configured to allow a user to select one possible frequency of the possible light intensity changing frequencies detected by the detector, wherein the frequency determining portion determines the light intensity changing frequency to be the one possible frequency selected by the user via the selector.

5. The flicker measuring device as recited in claim 1, further comprising an input portion configured to allow the user to input the light intensity changing frequency, wherein the frequency determining portion determines the light intensity changing frequency to be one possible frequency of the possible light intensity changing frequencies detected by the detector, the one possible frequency being the closest to the light intensity changing frequency inputted via the input portion.

6. The flicker measuring device as recited in claim 2, wherein the detector detects the possible light intensity changing frequency by interpolation, the interpolation using the intensity at the frequency adjacent to the singular frequency according to the frequency spectrum data, the singular frequency having the intensity higher than the intensity at the adjacent frequency.

7. The flicker measuring device as recited in claim 1, wherein the detector:
obtains waveform data of light intensity changes by preparatory measuring prior to flicker measuring; and
detects the possible light intensity changing frequency by an autocorrelation analysis of the waveform data.

8. The flicker measuring device as recited in claim 1, wherein the frequency resolution is 1 Hz or higher.

9. The flicker measuring device as recited in claim 1, further comprising a recording portion configured to record the frequency resolution determined by the resolution determining portion.

10. A flicker measuring method comprising:
detecting a possible light intensity changing frequency of a measuring object by a detector,
determining a light intensity changing frequency with reference to the detected possible light intensity changing frequency by a frequency determining portion,
determining a frequency resolution for flicker measuring with reference to the determined light intensity changing frequency by a resolution determining portion; and
measuring flicker with the determined frequency resolution by a flicker measuring portion, wherein the frequency resolution is determined to be an integral submultiple of the determined light intensity changing frequency.

11. The flicker measuring method as recited in claim 10, wherein:
waveform data of light intensity changes is obtained by preparatory measuring prior to flicker measuring,
frequency spectrum data is obtained by computing a Fourier transform of the waveform data; and
the possible light intensity changing frequency is detected with reference to a singular frequency with an intensity being higher than an intensity at an adjacent frequency according to the frequency spectrum data.

12. The flicker measuring method as recited in claim 10, wherein the light intensity changing frequency is determined to be a lowest possible frequency among the possible light intensity changing frequencies.

13. The flicker measuring method as recited in claim 10, wherein the light intensity changing frequency is determined to be one possible frequency of the detected possible light intensity changing frequencies, the one possible frequency being selected by a user via a selector.

14. The flicker measuring method as recited in claim 10, wherein the light intensity changing frequency is determined to be one possible frequency of the detected possible light intensity changing frequencies, the one possible frequency being the closest to a light intensity changing frequency inputted by a user via an input portion.

15. The flicker measuring method as recited in claim 11, wherein the possible light intensity changing frequency is detected by interpolation using the intensity at the frequency adjacent to the singular frequency according to the frequency spectrum data, the singular frequency having the intensity higher than the intensity at the adjacent frequency.

16. The flicker measuring method as recited in claim 10, wherein:
waveform data of light intensity changes is obtained by preparatory measuring prior to flicker measuring; and
the possible light intensity changing frequency is detected by an autocorrelation analysis of the waveform data.

17. The flicker measuring method as recited in claim 10, wherein the frequency resolution is 1 Hz or higher.

18. The flicker measuring method as recited in claim 10, further comprising recording and storing the determined frequency resolution.

* * * * *